United States Patent
White et al.

(10) Patent No.: US 12,139,057 B1
(45) Date of Patent: Nov. 12, 2024

(54) COMFORT ASSEMBLY FOR A VEHICLE SEAT

(71) Applicant: GENTHERM INCORPORATED, Northville, MI (US)

(72) Inventors: Andrew Charles White, Greenville, SC (US); David Eisenbacher, Troy, MI (US); Erich Doerfler, Landsberg (DE); Igor Spasojevic, Belle River (CA); Ajay Murgod, Novi, MI (US); Robert Falzon, Redford, MI (US); Carmen D'Accriscio, Belle River (CA)

(73) Assignee: GENTHERM INCORPORATED, Northville, MI (US)

( * ) Notice: Subject to any disclaimer, the term of this patent is extended or adjusted under 35 U.S.C. 154(b) by 0 days.

(21) Appl. No.: 18/638,807

(22) Filed: Apr. 18, 2024

Related U.S. Application Data

(60) Provisional application No. 63/591,150, filed on Oct. 18, 2023.

(51) Int. Cl.
    *B60N 2/56* (2006.01)
    *B60N 2/70* (2006.01)
    *B60N 2/90* (2018.01)

(52) U.S. Cl.
    CPC ......... *B60N 2/5685* (2013.01); *B60N 2/7082* (2013.01); *B60N 2/976* (2018.02)

(58) Field of Classification Search
    CPC ..... B60N 2/5685; B60N 2/976; B60N 2/7082
    See application file for complete search history.

(56) References Cited

U.S. PATENT DOCUMENTS

| | | | |
|---|---|---|---|
| 4,777,351 A | 10/1988 | Batliwalla et al. | |
| 4,931,627 A | 6/1990 | Watts | |
| 5,451,747 A | 9/1995 | Sullivan et al. | |
| 6,150,642 A | 11/2000 | Weiss et al. | |
| 6,710,303 B1 | 3/2004 | Lorenzen | |
| 6,838,647 B2 | 1/2005 | Nägele | |
| 6,869,140 B2 | 3/2005 | White et al. | |
| 7,223,948 B2 | 5/2007 | Howick et al. | |
| 7,285,748 B2 | 10/2007 | Nelson et al. | |
| 7,560,670 B2 | 7/2009 | Lorenzen et al. | |
| 7,676,324 B2 | 3/2010 | Bae | |
| 7,714,701 B2 | 5/2010 | Altan et al. | |
| 7,862,113 B2 | 1/2011 | Knoll | |
| 7,866,017 B2 | 1/2011 | Knoll | |
| 8,162,398 B2* | 4/2012 | Colja | A61H 9/0078 297/284.6 |
| 8,481,890 B2* | 7/2013 | Volden | B32B 5/024 219/211 |
| 9,302,601 B2* | 4/2016 | Worlitz | B60N 2/976 |

(Continued)

FOREIGN PATENT DOCUMENTS

EP 4223188 A1 8/2023

*Primary Examiner* — Philip F Gabler
(74) *Attorney, Agent, or Firm* — The Dobrusin Law Firm, P.C.

(57) ABSTRACT

A comfort assembly for a vehicle seat cushion, the comfort system includes a carrier having a thermal device; a spacer layer attached to the B-side of the carrier; and an effector device attached to the spacer layer so that the spacer layer is between the effector device and the B-side of the carrier; the effector device is attached to the carrier before the comfort assembly is installed onto an A-surface of the cushion of the vehicle seat.

14 Claims, 7 Drawing Sheets

(56) References Cited

U.S. PATENT DOCUMENTS

| | | |
|---|---|---|
| 9,440,567 B2 | 9/2016 | Lazanja et al. |
| 10,427,567 B2 | 10/2019 | Line et al. |
| 10,700,253 B2 | 6/2020 | Dry et al. |
| 10,906,442 B2 | 2/2021 | Klein |
| 11,033,058 B2 | 6/2021 | Cauchy |
| 11,065,991 B2 | 7/2021 | Iacovone et al. |
| 11,135,950 B2 | 10/2021 | Migneco et al. |
| 11,370,337 B2* | 6/2022 | Greenwood ......... B60N 2/5642 |
| 2007/0176471 A1 | 8/2007 | Knoll et al. |
| 2007/0241595 A1 | 10/2007 | Nathan et al. |
| 2010/0289303 A1 | 11/2010 | Nakamura et al. |
| 2011/0068611 A1* | 3/2011 | Maeda .................... B60N 2/66 |
| | | 297/284.4 |
| 2012/0313420 A1 | 12/2012 | Beyerlein et al. |
| 2013/0127226 A1 | 5/2013 | Beyerlein et al. |
| 2015/0251580 A1* | 9/2015 | Sachs .................... B60N 2/565 |
| | | 297/180.13 |
| 2018/0178694 A1 | 6/2018 | McMillen et al. |
| 2020/0025424 A1 | 1/2020 | Cauchy |
| 2020/0406797 A1 | 12/2020 | Greenwood |
| 2021/0300224 A1* | 9/2021 | Tait .......................... B60N 2/56 |

* cited by examiner

COMFORT ASSEMBLY FOR A VEHICLE SEAT

CROSS REFERENCE TO RELATED APPLICATIONS

This application claims the benefit of U.S. 63/591,150 filed on Oct. 18, 2023, the entirety of which is hereby incorporated by reference herein for all purposes.

FIELD

These teachings relate to a comfort assembly for a vehicle seat.

BACKGROUND

Some vehicle seats include one or more systems for improving occupant comfort. For example, a vehicle seat may include a thermal device to provide heating and/or cooling functions to an occupant of the vehicle seat; a pneumatic device to provide massage and/or lumbar functions to an occupant of the vehicle seat; and/or a haptic device to alert or provide feedback to an occupant of the vehicle seat.

While consumers enjoy and have come to expect such comfort systems in their vehicle seat, the comfort systems may undesirably complicate vehicle seat design; may require multiple individual comfort systems or devices to be supplied to a vehicle seat assembler from multiple different vendors; may require additional assembly steps and/or operators to install the various comfort systems or devices in the vehicle seat; and/or may complicate overall vehicle seat assembly. Furthermore, many vehicle seats require a specific seat cushion or support surface design to accommodate each of the various comfort systems or devices. This may undesirably require a vehicle seat assembler to carry multiple different seat cushions or support surfaces in inventory and to coordinate the assembly of multiple different seat cushions or support surfaces with multiple different comfort systems.

Accordingly, it may be desirable to improve the current state of the art. For example, it may be desirable to have a comfort assembly for a vehicle seat that incorporates or combines multiple different comfort systems or devices into a single assembly. A single comfort system or assembly that combines more than two comfort systems or devices may advantageously simplify and/or reduce assembly time and/ or steps at the vehicle seat assembler. For example, it may be desirable to have a comfort assembly for a vehicle seat that does not require a specific seat cushion or support surface to accommodate one or more of the comfort systems. This may advantageously reduce the number of different seat cushions support surfaces and part numbers in inventory at the assembler; may reduce assembly time and complications; and/or may reduce cushion tooling costs.

SUMMARY

These teachings relate to a comfort assembly for a vehicle seat, a vehicle seat having a comfort device, and to a method of installing a comfort assembly in a vehicle seat.

The comfort assembly according to these teachings integrates or combines two or more comfort devices into a single system or assembly. By combining two or more discrete devices into a single, combined assembly according to these teachings, numerous benefits can be realized. For example, the number of individual part numbers that are carried in inventory of the vehicle seat assembler can be reduced and the space needed to inventory individual comfort devices can be reduced. The number of method steps to install two or more comfort devices in a vehicle seat can be reduced and/or combined, thereby reducing assembly time and space. The amount of packaging and dunnage can be reduced, since two or more comfort devices can now be shipped and received in a single container, as opposed to individual containers for each comfort devices. The space needed at the assembly line can be reduced since the number of individual parts required at the line is reduced.

The comfort system according to these teachings includes one or more comfort devices that are supported at, are supported on, or are supported by, one or both sides of the carrier. Preferably, the comfort assembly includes one or more comfort devices on one side of a carrier and one or more comfort devices on another side of the carrier.

As used herein, "supported at" or "supported on" or "supported by" (hereafter "supported terms") may mean the respective component of the comfort system is attached to the carrier or spacer layer. The supported terms may mean the respective component of the comfort system is directly attached or fixed or secured to the carrier and/or spacer layer. The supported terms may mean the respective component of the comfort system is indirectly attached or fixed or secured to the carrier and/or spacer layer, which may mean that one or more other elements or layers are arranged in between the carrier and/or spacer layer and the element of the comfort system. The supported terms may mean the respective component of the comfort system is fixed, attached, or secured to the carrier and/or spacer layer with one or more attachment devices disclosed herein. The supported terms may mean the respective component of the comfort system is at least partially in direct contact with the carrier and/or spacer layer. The supported terms may mean the respective component of the comfort system is at least partially in indirect contact with the carrier and/or spacer layer, which may mean that one or more other elements or layers are arranged in between the carrier and/or spacer layer and the element of the comfort system.

The comfort devices according to these teachings include one or more connectors. The one or more connectors may be a combined connector that allows for a single connector to power and or control the two or more comfort devices. This connector may help to simplify the assembly process by requiring the installer to use a connector for powering, controlling, and/or monitoring some or all the comfort devices that are part of the comfort assembly. In some configurations, the comfort assembly may include more than one connector for powering, controlling, and/or monitoring the comfort devices of the comfort assembly. For example, the wiring of the effector device (i.e., haptic and/or pneumatic device) could go to an independent connector or could be integrated into the connector associated with the thermal device. The comfort assembly comprises a single connector for connecting the comfort assembly to a vehicle controller, the single connector is electrically connected to the thermal device and to the effector device.

The support surface of some vehicle seats in the field includes one or more pockets or recesses. A pocket or recess may be an absence of material. A pocket or recess may be a region of the carrier or spacer layer, where a thickness of the carrier spacer layer has been reduced or thinned out relative to other regions of the carrier or spacer layer. A pocket or recess may be a region of the carrier or spacer layer that has been completely removed.

In some configurations, a recess may be defined by adding one or more strips or segments of material to the carrier or spacer layer. For example, one or more spaced apart strips of material having virtually any shape and size may be supported at, on, or by the carrier or spacer layer. One or more elements of the effector system may then be positioned within or between the spaced apart strips or within the "recess" defined between the spaced apart strips.

The pockets or recesses are typically configured to accommodate one or more elements of the seat or comfort devices. For example, some support surfaces include a pocket or recess into which one or more air cells of a pneumatic device are arranged—See FIGS. 1 and 2 of U.S. Pat. No. 11,364,831 B2, which shows a recess in the seat cushion in which a bladder is arranged and is covered by a seat cover. For example, some support surfaces include a pocket or recess into which one or more alerting elements of a haptic device are arranged—See FIG. 1 of U.S. Pat. No. 9,004,589, which shows a support surface having a preformed recess in which a haptic motor is located. The one or more pockets or recesses may function to compensate for the height or thickness of the one or more elements of the effector device, haptic device, pneumatic device. By tucking the elements into the one or more recesses or pockets, lumps, hard spots, or high spots that may be created by the one or more elements may be compensated for, avoided or eliminated. Advantageously, by providing the elements of the thermal and/or effector devices into one or more pockets in the carrier and/or support layer, the assembly foam can be kept flat and there wouldn't be a difference between a foam with and without the comfort devices.

Support surfaces having such preformed pockets or recesses are typically tooled specifically for a particular comfort system. A vehicle seat assembler is therefore required to inventory several different vehicle support surfaces to accommodate vehicle seats with different comfort options. For example, a vehicle seat assembler may be required to have in its inventory a support surface with recesses to accommodate a pneumatic device, a support surface with recesses to accommodate a haptic device, a support surface with recesses to accommodate both a pneumatic and haptic device, and a support surface that is intended to accommodate no pneumatic or haptic devices.

The comfort assembly according to these teachings comprises a carrier having one or more pockets or recesses. The one or more pockets or recesses are intended to accommodate one or more elements of the vehicle seat and/or comfort assembly. For example, the one or more pockets or recesses are intended to accommodate or receive therein the one or more air cells of a pneumatic device, the one or more elements of an effector device, the one or more alerting elements of the haptic device, one or more wires or tubes of the haptic device, the pneumatic device, the thermal device, or combination thereof. In some configurations, one or more valves, modules, processors, controllers, feedback systems, power sources, or combination thereof associated with the comfort assembly may be provided in or supported in, at, or by the one or more recesses or pockets in the carrier.

Accordingly, in an advantageous manner, it may be possible to install the comfort assembly according to these teachings onto a support surface that does not necessarily have specific preformed recesses and pockets because the recesses and elements are instead part of the comfort assembly. Advantageously, this may reduce the number of distinct or separate support surface part numbers required to be kept in inventory at the vehicle seat assembler. This may also help improve the process flow of vehicle seat during assembly in eliminating the need to ensure that the correct seat support surface is being used with the correct comfort systems.

As another advantage by not requiring customized recesses or pockets in the seat support surface with which the comfort assembly according to these teachings is intended to be used, the comfort assembly according to these teachings may be used as a retrofit application in which a vehicle seat that is not previously equipped with one or more comfort systems or assemblies can be outfitted with such comfort amenities without disrupting the overall structure or integrity of the seat support surface.

In some configurations, the cushion or support surface may include one or more recesses or pockets. The one or more recesses or pockets in the cushion or support surface may be configured to receive at least some of the components of the comfort assembly. For example, the one or more recesses or pockets defined in the cushion or support surface may be configured or sized to at least partially receive or support one or more of the effector devices, the pneumatic devices, the thermal devices, or any combination thereof. More specifically, the one or more recesses or pockets defined in the cushion or support surface may be configured or sized to at least partially receive or support one or more of the air cells, one or more spacer layers, one or more heating devices, or a combination thereof. An adhesive or any suitable fastening device may be used to secure the element(s) of the comfort assembly to the one or more recesses or pockets or to the cushion or support surface. The one or more recess or pockets in the cushion may be formed via a suitable method such as a material removal process like cutting, milling, drilling, notching, melting, etc. The one or more recess or pockets in the cushion may be formed while the cushion is moulded or thermoformed and does not require additional removal method steps.

In some configurations, a cushion or support surface having one or more pockets or recesses to accommodate at least some of the elements of the comfort assembly may be used with a carrier or spacer layer having one or more pockets also for accommodating some of the elements of the comfort assembly. In other configurations, the cushion or support surface may be free of any recesses or pockets for accommodating elements of the comfort assembly. In some configurations, only the carrier or spacer layer has one or more recesses or pockets for accommodating one or more elements of the comfort assembly.

The one or more pockets or recesses in the carrier according to these teachings may be formed in the first or A-side of the carrier, the second or B-side of the carrier, or both. In some configurations, the comfort assembly according to these teachings may include a spacer layer. The spacer layer may include the one or more recesses or pockets for accommodating one or more elements of the comfort devices. The one or more recesses or pockets may be on the A-side and/or the B-side of the spacer layer. The one or more recesses or pockets in the comfort assembly, carrier, or spacer layer according to these teachings may be formed with any suitable manufacturing or forming method, such as, for example, moulding, thermoforming, cutting, melting, notching, milling, or combination thereof.

The comfort assembly according to these teachings may include one or more spacer layers. A spacer layer may be one or more layers that are supported at, on, or by one or both sides of the carrier. A spacer layer may be provided or supported at, on, by, or between a side of the carrier and one or more elements of the one or more comfort devices that are supported on the carrier. For example, a spacer layer may be located in between a side of the carrier and the one or more elements of the thermal device, one or more elements of the effector device, one or more elements of the haptic device, and/or one or more elements of the pneumatic device. The one or more air cells may be sandwiched between the A-surface of the support surface of the vehicle seat and the spacer layer, the support surface of the vehicle seat is a seat cushion.

In some configurations, one or more spacer layers may be provided or support at, on, by, or over or on top of one or more elements of the thermal device, one or more elements of the effector device, one or more elements of the haptic device, and/or one or more elements of the pneumatic device, such that the one or more elements of the thermal device, one or more elements of the haptic device, and/or one or more elements of the pneumatic device are in between the carrier and the spacer layer.

A spacer layer may be made of the same material as the carrier or a different material as the carrier. A spacer layer may have the same thickness as the thickness of the carrier. The spacer layer may have a thinner or thicker thickness than the thickness of the carrier. The spacer layer may comprise a material made from a foam, TPU, TPU foil, extruded TPU foil, thermal mat fleece, PU film, and/or a spun bond material. The spacer layer may be an air permeable or an air impermeable material or layer. The spacer layer may be configured to reduce or prevent read through of the comfort assembly or elements thereof (i.e., the pneumatic system 116) before or during activation thereof.

The carrier and/or the spacer layer may be air permeable so that an air flow may pass through the carrier, the spacer layer, or both. This may be especially important and advantageous if the vehicle seat or comfort assembly includes a further comfort device that is a ventilated device for moving air towards or away from an occupant in the vehicle seat (i.e., a push and/or pull ventilated vehicle comfort device). Such a comfort device may include a fan or other air mover for directing an air flow through the carrier and/or the spacer layers towards the occupant (e.g., operating in a "push mode"). Such a comfort device may include a fan or other air mover for sucking or pulling an air flow through the carrier and/or the spacer layers away from the occupant (e.g., operating in a "pull mode"). In the event the comfort device includes such a ventilated comfort device, the spacer layer and/or the carrier may function as an air distribution device.

The spacer layer can be formed of or from one or a variety of materials such as a honey-combed foam material, material with channels and passages formed therein, 3D materials or spacer fabrics, mesh netting fabrics, spacing plates, etc. As an example, one preferred material is sold under the trade name 3MESH® and is commercially available from Mueller Textil GmbH, Germany or Mueller Textiles, Inc., Rhode Island, USA. Other preferred spacing devices and spacer layers are disclosed in U.S. Pat. No. 8,777,320, the entirety of which is incorporated by reference herein in its entirety.

The spacer layer may be made of a cloth, fleece, felt, polyester, PET (polyethylene terephthalate) material. The spacer layer may be a foam, a plush foam, a comfort form, a pad, a comfort pad, a plush pad, or a combination thereof.

The spacer layer may be configured to generally retain its three-dimensional shape when subjected to compressive and/or other types of forces. The spacer layer may include internal pores or passages that permit air or other fluid to pass therethrough. For example, the spacer layer can comprise an internal lattice or other structure which has internal openings. The spacer layer may be a screen or a mesh. The spacer layer may be compressible, elastic, resilient, or a combination thereof. The spacer layer may have sufficient resiliency to prevent crushing of spacer layer when an occupant sits on or leans back against the vehicle seat. The spacer layer may include upper netting layer, a lower netting layer and a plurality of fibres extending between them.

The comfort assembly according to these teachings includes one or more attachment devices. An attachment device is used here and may be any one or more attachment devices or attachment methods that are used to attach or secure one or more elements of the comfort assembly. For example, an attachment device and/or associated attachment method may be, or may include, welding, RF welding, ultrasonic welding, glue, adhesives, epoxies, sewing, weaving, fastening, clips, staples, rivets, eyelets, hook and loop fasteners, tape, double sided tape, pressure sensitive tape, or any combination thereof. The one or more attachment devices may include one or more attaching substrate elements (e.g., straps) that are attached to the carrier to provide a channel for the one or more wires or tubes to pass or weave under. The one or more attachment devices may be located on the A-side of the carrier or spacer layer, the B-side of the carrier or spacer layer, or both.

The one more attachment devices and associated attachment methods may be configured to attach the heating wire to the carrier, the connector to the carrier, the one and more air cells to the carrier, the one or more spacer layers to the carrier, the one or more haptic elements to the carrier, or any combinations throughout. The one or more attachment devices may also be used to attach the carrier or the comfort assembly to the vehicle seat support surface or to another mounting surface. The one or more attachment devices may be used to attach the trim layer to the support surface and or to the comfort assembly. The one or more attachment devices according to these teachings may be used to attach or secure other elements associated with the vehicle seat to the carrier, the comfort assembly, the support surface, or a combination thereof.

The comfort assembly may include one or more comfort devices. A comfort device may be an effector device, a pneumatic device, a haptic device, a thermal device, or combination thereof. Other comfort devices may be incorporated into the comfort assembly according to these teachings and may be, or may include, an occupancy device or associated sensor, a temperature device or associated sensor, or other sensors or devices that may be part of a vehicle or vehicle seat.

The thermal device may be a device that is configured to generate heating and or cooling to increase or decrease a surface temperature of the vehicle seat. The thermal device may be of the type disclosed in any of the following U.S. Pat. Nos. 11,033,058; 7,560,670; 7,285,748; 7,223,948; 6,838,647; 6,869,140; 6,710,303; 6,150,642; 5,451,747; 4,931,627; 4,777,351; U.S. Patent Publication Nos. 20200406797, 20200025424 2010/0289303, and/or 20070176471 all of which are expressly incorporated herein by reference for all purposes. The thermal device may be a cooling mat that may include one or more cooling elements. The one or more cooling elements may be one or more graphite/graphene strips, as disclosed in U.S. Pat. No. 11,033,058 and US Publication US20200025424A1, both of which are incorporated by reference for all purposes.

The pneumatic device may be a system that is configured to provide massage of our lumbar functions to an occupant of the vehicle seat. The pneumatic device may include one or more elements that are configured to be inflated and deflated to apply and release pressure on the vehicle seat and the occupant. For example, the one or more elements may be one or more air cells, balloons, pouches, bladders, or combination thereof. The pneumatic system may be of the type disclosed in US2012/0313420, US21013/0127226, and/or U.S. Pat. No. 10,906,442 B2 all of which is expressly incorporated by reference herein for all purposes.

The haptic device may be configured to generate one or more audio, visual, and/or tactile alerts to alert the occupant of an event before, after, or during occurrence of one or more events. The haptic device may comprise one or more alerting or feedback elements. The one or more alerting or feedback elements may be one or more motors, speakers, lights, sirens, music low frequency effects, and/or other devices that are configured to alert or provide feedback to an occupant by to alert the occupant before, during, and/or after occurrence of an event. The one or more haptic elements may be or may include a noise generating device. The one or more haptic elements may be or may include one or more masses, one or more permanent magnets, one or more coils, or a combination thereof. When the haptic element is excited, the mass may vibrate against a housing or other substrate, which may generate a low frequency vibration or music. An example of a haptic device may be of the type disclosed in US U.S. Pat. No. 7,676,324B2, U.S. Pat. No. 7,714,701B2, and/or US20070241595A1 all of which are incorporated by reference herein for all purposes.

The one or more wires associated with the effector device (i.e., pneumatic device, haptic device, or both) may be attached to or supported at, on, or by the carrier, the spacer layer, or both using one or more of any of the attachment devices disclosed herein. The wires of the effector device may be located on the same side of the carrier as the thermal device wires. In other configurations, the wires of the effector device may be located on the opposite or other side of the carrier as the thermal device wires. By including the thermal device wires on one side of the carrier or spacer layer and the wires for the effector device on the other side of the carrier or spacer layer, "crossing-over" of the wires may be avoided. If the wires "cross" or overlap one another, interference may occur and/or the thermal wires may overheat and burn the effector device wires. The wiring for the haptic device may be in independent circuits (e.g., one single circuit for each alerting or feedback element) or in a circuit that has multiple alerting or feedback elements "daisy-chained" in either parallel or series.

An effector device may be one or a combination of the thermal device, the pneumatic device, the haptic device, any of the other devices disclosed herein, or any combination thereof.

DETAILED DESCRIPTION

Figure 1:
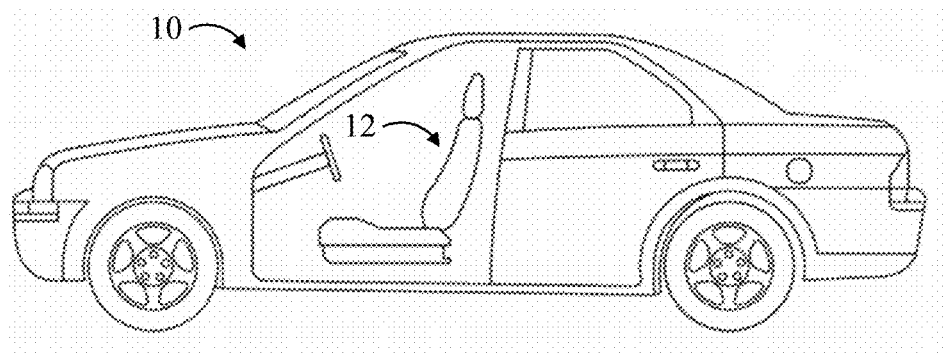
FIG. 1 is a side view of a vehicle comprising one or more vehicle seats.

FIG. 1 illustrates a vehicle 10. The vehicle 10 comprises one or more vehicle seats 12.

Figures 2, 3:
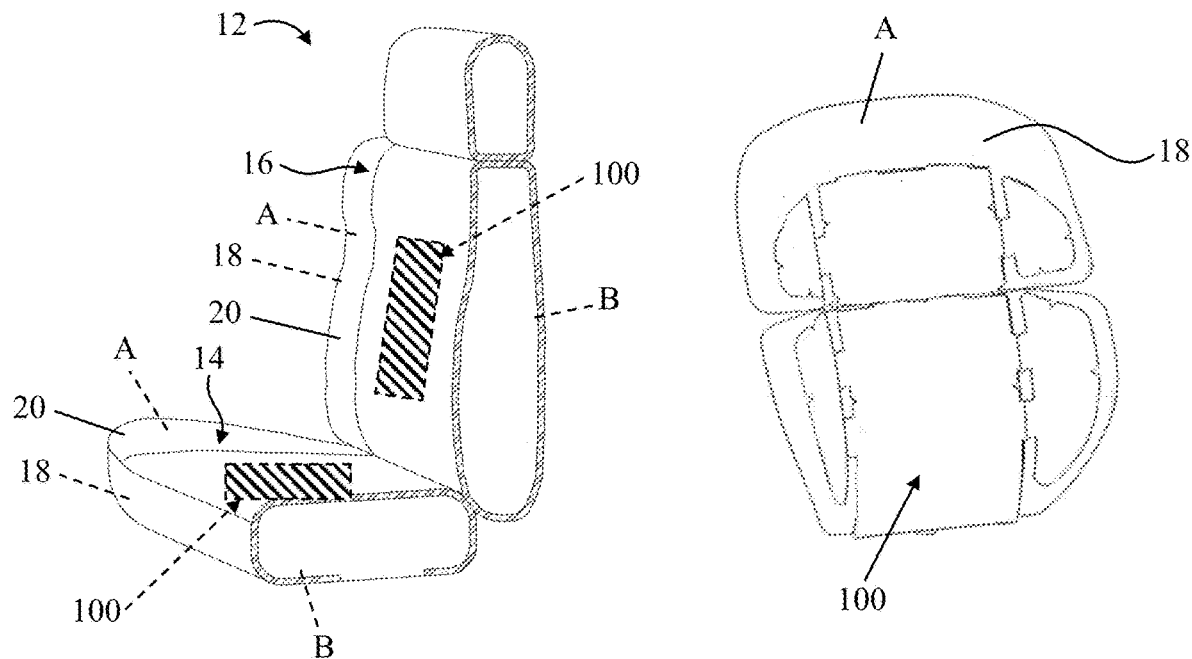
FIG. 2 is perspective view of a vehicle seat.
FIG. 3 is a perspective view of support surface of the vehicle seat and the comfort assembly according to these teachings on an A-surface of the support surface.

FIG. 2 illustrates a vehicle seat 12. The vehicle seat 12 comprises a seating portion 14 and a backrest portion 16. The seating portion 14 and the backrest portion 16 comprise a support surface 18. The support surface 18 may be or may include a cushion.

The support surface 18 may be a single support surface or cushion for both portions 14, 16. The support surface 18 may be one or more discrete or individual pieces for each of the seating portions 14, 16. The support surface 18 has a front, A-side, or A-surface and an opposing back, B-side, or B-surface. When an occupant is seated in the vehicle seat 12, the front or A-side of the support surface 18 is closest to the occupant. Therefore, reference to support surface herein may refer to the seating portion 14, backrest portion 16, or both. A cover or trim layer 20 may cover the support surface 18. The cover or trim layer 20 may be perforated leather, cloth, or other fabric-type materials suitable for use in the interior of a vehicle and on a vehicle seat 12.

The vehicle seat 12 may include one or more comfort assemblies 100. The comfort assembly 100 may be, or may include a thermal device, an effector device, or both. The effector device may be or may include a pneumatic device, and/or a haptic device. The comfort assembly 100 may also be referred to herein as a combined comfort system, device, or assembly because it may include features from two or more of the thermal, effector, pneumatic, and/or haptic devices, or additional comfort or monitoring devices.

Referring now to FIG. 3, the comfort assembly 100 is attached to or installed or is supported at, on, or by the front or A-side of the support surface 18 or cushion. However, in some configurations, the comfort assembly 100 or components thereof may be attached to or installed or supported at, on, or by the back or B-side of the support device 18 or cushion. For example, one or more motors, valves, controllers, wires, tubes, systems for operating the comfort assembly, other sensors or devices associated with the comfort assembly 100 or associated with any of the comfort devices disclosed herein may be at least partially or entirely attached to or supported at, on, or by the side or back or B-side of the support device 18.

While the support surface illustrated in FIG. 3 may be referred to as the cushion for use with the backrest portion 18, the teachings associated with the support surface or cushion may also equally apply to the cushion for use with the seating portion 14, unless otherwise noted.

Figure 4:
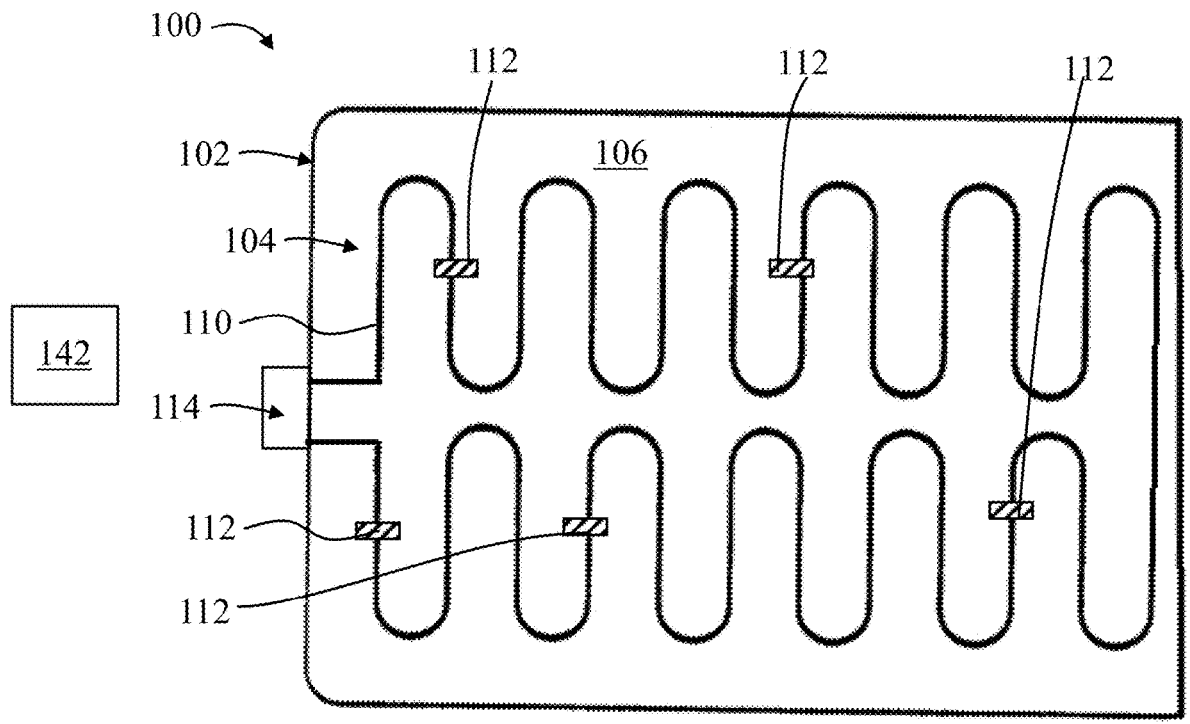
FIG. 4 is a schematic front view or A-side of a comfort assembly.
Figure 5:
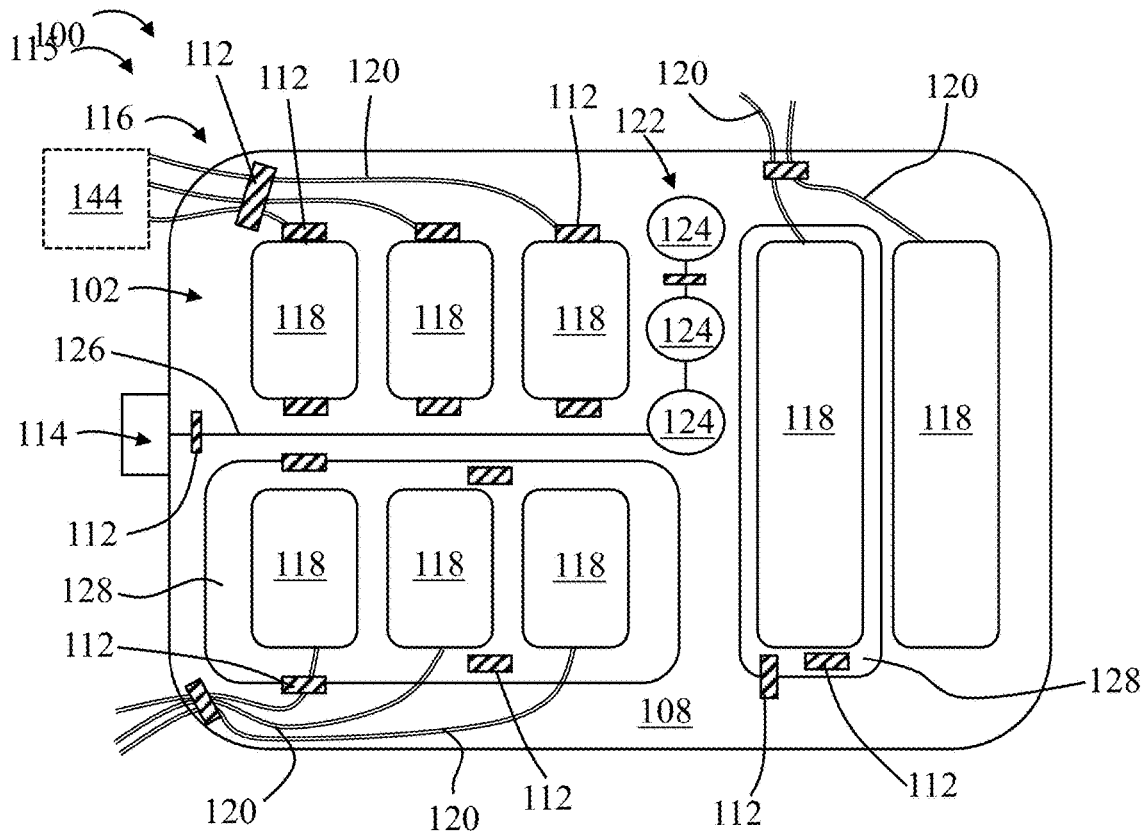
FIG. 5 is a schematic back view or B-side of a comfort assembly.

FIG. 4 illustrates a comfort assembly 100. The comfort assembly 100 comprises a carrier 102 and a thermal device 104 attached to or supported at, on, or by a first side 106 of the carrier 102. The heating device 104 may be or comprise a heating wire 110 that is located on the first or A-side of the carrier 102 and/or within a thickness of the carrier 102 (i.e., between the first and second sides of the carrier 102). Referring briefly to FIG. 5, the carrier 102 also comprises a second side or B-side 108 that opposes the first side or A-side 106 of the carrier 102. With additional reference back to FIG. 3, after the comfort system 100 is installed on the support device 18, the first side or A-side 106 of the carrier 102 may be the side of the carrier 102 that is configured to face away from the front or A-surface of the support device 18, and the second side or the B-side 108 of the carrier 102 is configured to contact or lay on top of the front or A-side of the support device 18 or the cushion. In some configurations, this orientation may be reversed.

Referring to FIG. 4, the thermal device 104 comprises one or more heating wires 110. The heating wire 110 may be attached to or supported at, on, or by the carrier 102 via one or more attachment devices 112. The one or more attachment devices 112 may be configured to attach or secure the one or more heating wires 110 to the carrier 102. The one or more attachment devices 112 may be configured to attach or secure the one or more heating wires to the carrier 102 such that the heating wire 110 is restricted or prevented from moving or otherwise separating from the carrier 102. The heating wire 110 may be on the first or A-side 106 of the carrier, on the second or B-side 108 of the carrier, and/or within a thickness of the carrier 102 (between the A- and B-sides of the carrier 102).

The comfort assembly 100 may include a connector 114. The connector 114 may be configured to connect the comfort assembly 100 to a system 142 for operating the comfort assembly 100. For example, the system for operating the comfort assembly 100 may be or include a power source or controller or both. The system for operating the comfort assembly 142 may be configured to operate one or more of the comfort devices of the comfort assembly. The connector 114 may be configured to electrically connect the thermal device, the effector device, the pneumatic device, the haptic device, or any other comfort device associated with the comfort assembly 100 to the system for operating the comfort assembly, a computer, a controller, a power source, or any combination thereof 142. Advantageously, this connector 114 may be a single connector that allows for a single and quick connection and disconnection of the comfort assembly 100 and the controller, the power source, or the vehicle. Advantageously, this connector 114 may be a single connector that allows for controlling the comfort assembly 100, and more specifically for controlling two or more components of the comfort assembly 100 like the thermal device, the effector device, the pneumatic device, the haptic device, etc.

FIG. 5 illustrates a comfort assembly 100. The comfort assembly 100 comprises a carrier 102 and an effector device 115 attached to or supported at, on, or by the back, B-side, or the opposing second side 108 of the carrier 102. The effector device 115 may be a pneumatic device 116 that may be or may include a massage device, a lumbar device, or both.

The effector device 115 or the pneumatic device 116 comprises one or more air cells 118. The effector device 115 or the pneumatic device 116 and/or the one or more air cells 118 may be attached or supported at, on, or by to the second side 108 of the carrier 102. The second side 108 of the carrier 102 may be the side of the carrier 102 that opposes the first side or the A-side 106 of the carrier 102 (See FIG. 4).

The effector device 115 and/or the pneumatic device 116 comprises one or more tubes and/or wires 120. The one or more tubes and/or wires 120 may connect the pneumatic system 116 and/or the one or more air cells 118 to one or more sources of air, pumps, actuators, inflators, tanks, controllers, power sources, or combination thereof 144. The one or more tubes or wires 120 may be attached to or supported at, on, or by t the second side 108 of the carrier 102 via one or more attachment devices 112.

The effector device 115 may comprise a haptic device 122 attached to or supported at, on, or by the opposing second side or B-side 108 of the carrier 102. The haptic device 122 may be an alert or feedback system for providing alerts or notification to an occupant of the vehicle seat. The haptic device 122 may comprise one or more alerting elements 124. The haptic device 122 and/or the one or alerting or feedback elements 124 may be attached to or supported at, on, or by the second side 108 of the carrier 102 via one or more attachment devices 112. The one or more alerting or feedback elements 124 may be one or more motors, vibration device, sirens, lights, speakers, inflators, or a combination thereof that are configured to alert or provide feedback to an occupant by to alert the occupant before, during, and/or after occurrence of an event. The haptic device 122 comprises one or more wires 126. The one or more wires 126 may connect the haptic device 122 and/or the one or more alerting elements 124 to the connector 114, one or more controllers, one or more power sources, system for operating the haptic device or combination thereof 144. The one or more wires 126 may be attached to or supported at, on, or by the second side 108 of the carrier 102 via one or more attachment devices 112.

The thermal device 104 may be attached to tor supported at, on, or by the first side or A-side 106 of the carrier 102, and the effector device 115, the pneumatic device 116, and/or the haptic device 112 may be attached to or supported at, on, or by the second side or B-side 108 of the carrier 102 before the comfort assembly 100 is installed on an A-surface of the cushion 18 of the vehicle seat 12. In other words, the one or more heating wires 110 of the thermal device 104 may be located on one side of the carrier 102, and the one or more tubes or wires 120 of the pneumatic device 116, the one or more air cells 118 of the pneumatic device 116, the one or more vibration elements and the one or more wires 126 of the haptic device 122 may be located on the other side of the carrier 102. One or more of the heating wires 110 may be arranged within a thickness of the carrier 102 between the A- and B-surfaces of the carrier 102.

The comfort assembly 100 or the carrier 102 may include one or more spacer layers 128. A spacer layer 128 may be arranged under the pneumatic device 116 and/or the one or more air cells 118 of the pneumatic device 116 or the effector device 115. The spacer layer may be arranged under the haptic device 122 and or the one or more alerting elements 124 of the haptic device 122 or effector device 115. The spacer layer 128 may be air permeable or air impermeable. The spacer layer 128 may be attached to or supported at, on, or by the carrier 102 via one or more attachment devices 112. In some configurations, a spacer layer may be arranged over the pneumatic device 116 and/or the one or more air cells 118 of the pneumatic device 116 or the effector device 115. The spacer layer 128 may be attached to the B-side of the carrier 102 via one or more attachment or fastening devices disclosed herein (i.e., welding, tape, double sided tape, etc.).

Figure 6:
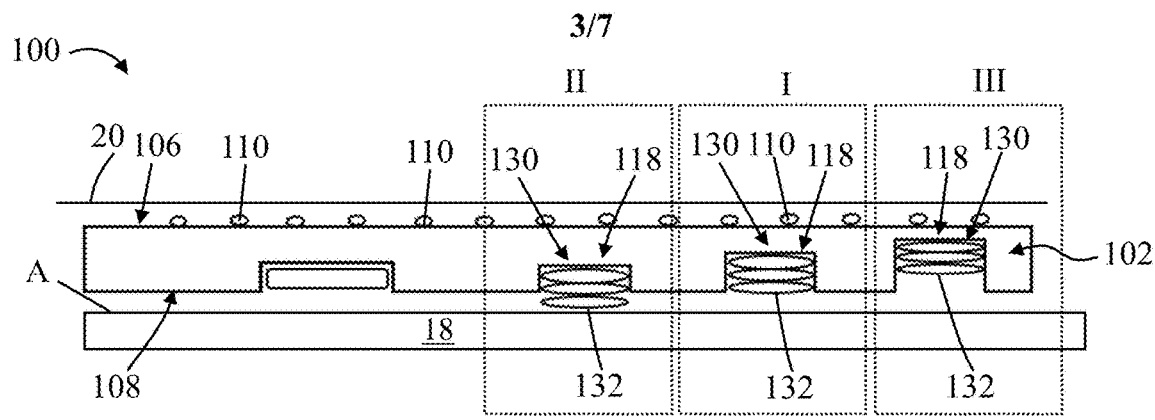
FIG. 6 is a side view of a comfort assembly and a cushion.

FIG. 6 illustrates a comfort assembly 100. The comfort assembly 100 is partially exploded. The comfort assembly 100 comprises a carrier 102 having a first side 106 and an opposing second side 108. In vehicle position, the first side or A-side 106 of the carrier 102 may be arranged closer to the trim or cover layer 20, and the second side or B-side may be provided on or attached to or supported at, on, or by the A-side A of the support device or cushion 18.

The first side 106 of the carrier 102 comprises the thermal device. More specifically, the heating wire 110 of the thermal device is attached to the first side 106 of the carrier 102 and/or may be disposed within a thickness of the carrier 102. The second side or B-side 108 of the carrier 102 comprises the pneumatic device. More specifically, the one or more air cells 118 of the pneumatic device is attached to or supported at, on, or by the second side 108 of the carrier 102.

The carrier 102 comprises one or more pockets or recesses 130 into which at least part of the effector system 115, the pneumatic device and/or the one or more air cells 118 are received.

The one or more air cells 118 comprise a top surface 132. The top surface 132 of the one or more air cells 118 may be a surface of the air cells 118 that is arranged closest to the A side of the support device or cushion 118 in vehicle position. The top surface 132 of their one or more air cells 118 maybe generally flush with the second side 108 or planar surface of the carrier 102, as illustrated in example I. The top surface 132 of their one or more air cells 118 may be generally proud or extend below or beyond the second side 108 or planar surface of the carrier 102, as illustrated in example II. The top surface 132 of their one or more air cells 118 may be generally sub-flush or extend below the second side 108 or planar surface of the carrier 102, as illustrated in example III. In any of these examples I, II, and II, the one or more air cells may be in an activated configuration (air inside the one or more cells, pre- or non-activated configuration (no air inside the one or more air cells), or in a use configuration where air or fluid is being supplied or withdrawn from the one or more air cells.

Figure 7:
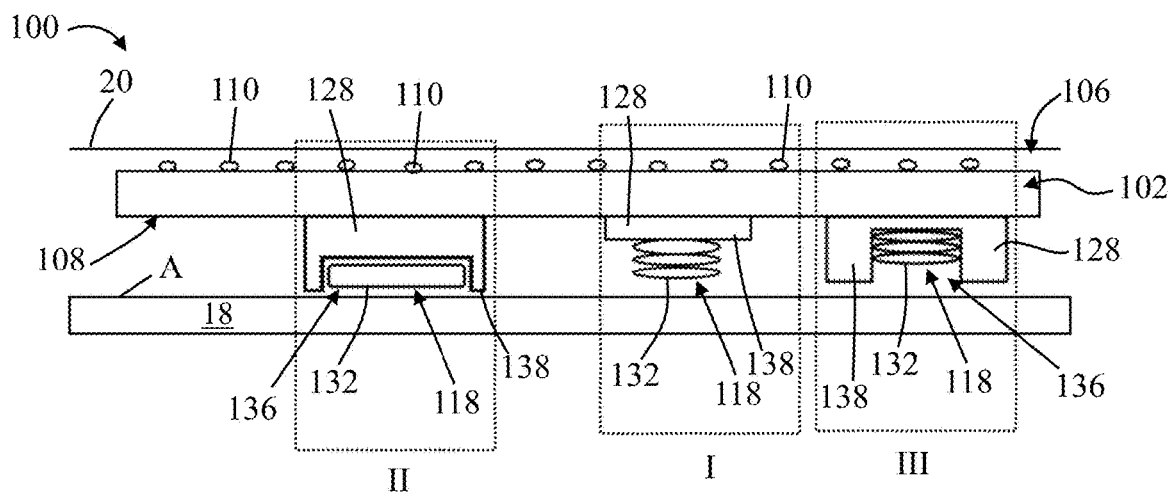
FIG. 7 is a side view of a comfort assembly and a cushion.

FIG. 7 illustrates a comfort assembly 100. The carrier 102 comprises a spacer layer 128 arranged on the second side or B-side 108 of the carrier 102. The spacer layer 128 may be between the carrier 102 and the effector device, the pneumatic device, and/or the one or more air cells 118 of the pneumatic device. The spacer layer 128 may include a top or planar surface 138.

The spacer layer 128 may include one or more pockets or recesses 136 into which at least part of the pneumatic system 116 and/or the one or more air cells 118 are received.

The one or more air cells 118 comprise a top surface 132. The top surface 132 of the one or more air cells 118 may be a surface of the air cells 118 that is arranged closest to the A side of the support device 118 in vehicle position. The top surface 132 of their one or more air cells 118 may be generally proud or extend below or beyond the top or planar surface 138 of the spacer layer 12, as illustrated in example I. While this example I illustrates no pocket or recess 136 into which the air cells 118 are arranged (instead, the air cells 118 are arranged on top of the spacer layer 128, a pocket or recess may be included in the spacer layer 128. The top surface 132 of their one or more air cells 118 maybe generally flush with the top or planar surface 138 of the spacer layer 128, as illustrated in example II. The top surface 132 of their one or more air cells 118 maybe generally sub-flush or below the top or planar surface 138 of the spacer layer 12, as illustrated in example III. In any of these examples I, II, and II, the one or more air cells may be in an activated configuration (air inside the one or more cells, pre- or non-activated configuration (no air inside the one or more air cells), or in a use configuration where air or fluid is being supplied or withdrawn from the one or more air cells.

Figure 8:
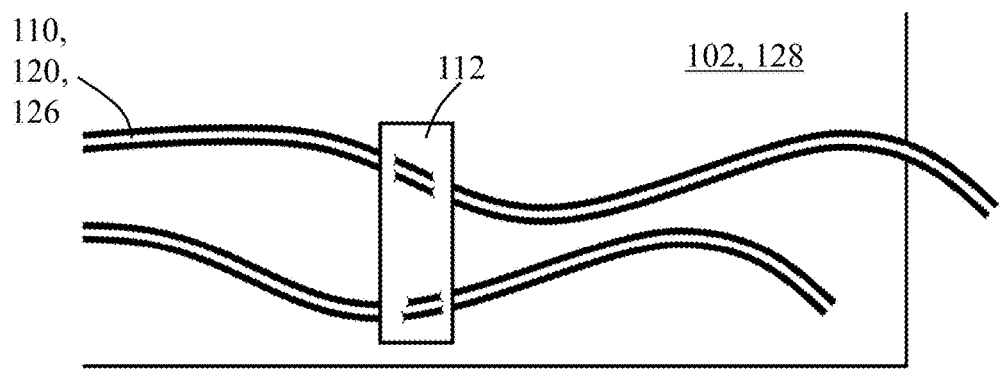
FIG. 8 is a schematic top view of an attachment device attaching one or more wires and/or tubes to the carrier and/or spacer layer of the comfort assembly.

FIG. 8 illustrates an attachment device 112 attaching one or more wires and/or tubes of the comfort devices to the carrier 102 or spacer layer 128 of the comfort assembly. The attachment device 112 may be a strap that is attached to or supported at, on, or by the carrier or spacer layer 128. The one or more wires or tubes 110, 120, 126 of the thermal device, the effector device, the haptic device, and/or the pneumatic device are partially routed under, over and through, and then again under the attachment device 112. The attachment device 112 itself may be attached or supported at, on, or by to the carrier 102 or spacer layer 128 via one or more attachment devices such as with sewing, welding, adhesives, etc.

Figure 9:
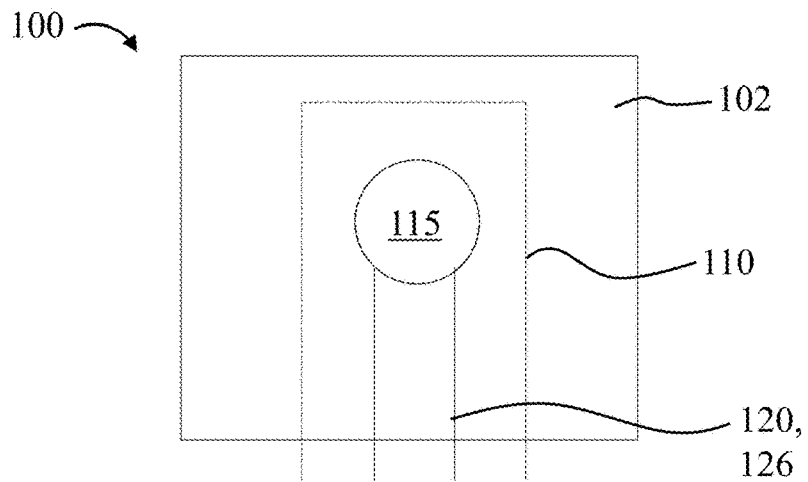
FIG. 9 is a schematic illustration of the comfort assembly that includes a thermal device and an effector device.
Figure 10:
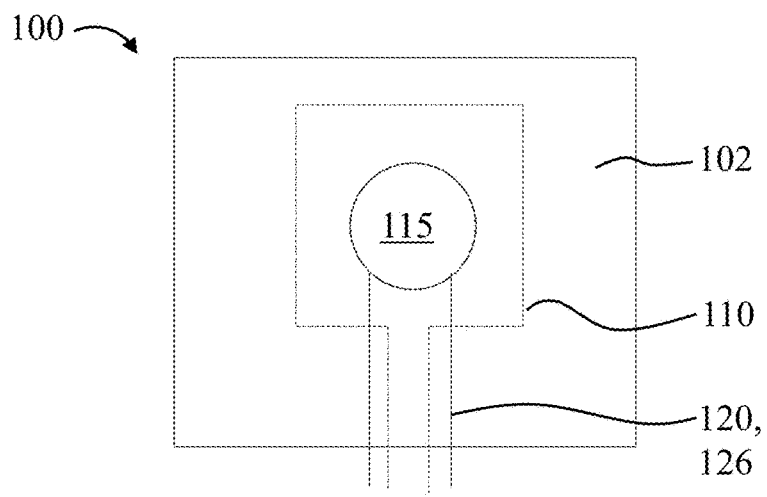
FIG. 10 is a schematic illustration of the comfort assembly that includes a thermal device and an effector device.
Figure 11:
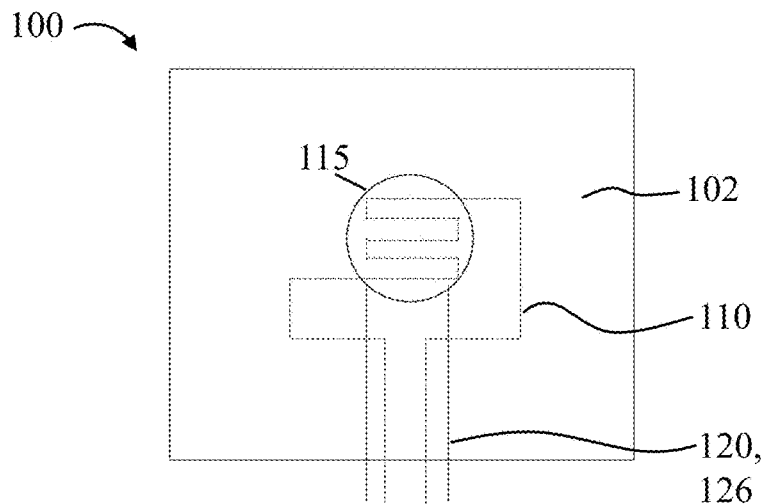
FIG. 11 is a schematic illustration of the comfort assembly that includes a thermal device and an effector device.

FIGS. 9, 10, and 11 are schematic illustrations of the comfort assembly 100 according to these teachings. The comfort assembly 100 comprises a carrier 102. The carrier 102 may include a single layer or may include on or more additional layers, such as one or more of the spacer layers disclosed herein. The comfort assembly 100 comprises a thermal device that includes a heating wire 110. The heating wire 100 is attached to or supported at, on, or by the carrier 102 via one or more of any of the attachment devices and/or methods disclosed herein. The effector device 115, which may be a pneumatic device, a haptic device, or both, includes one or more wires 120, 126 for connecting the effector device 115 to a controller or power source. As illustrated in FIG. 9, the wires 110 and 120, 126 do not cross over one another. This may be because the wires 110 and 120, 126 are located on opposite sides of the carrier 102 (e.g., on the front and back sides of the carrier 102). Or it may be because the heating wire 110 meanders or is arranged outside of the wiring 120, 126 of the effector device 115. In FIGS. 10 and 11, however, there is slight crossing over of the wires 110 and 120, 126. In FIG. 11, the heating wire 110 may be configured to heat the effector device 115 to provide the effector device 115 with additional heating to further comfort the occupant of the vehicle seat.

Figure 12:
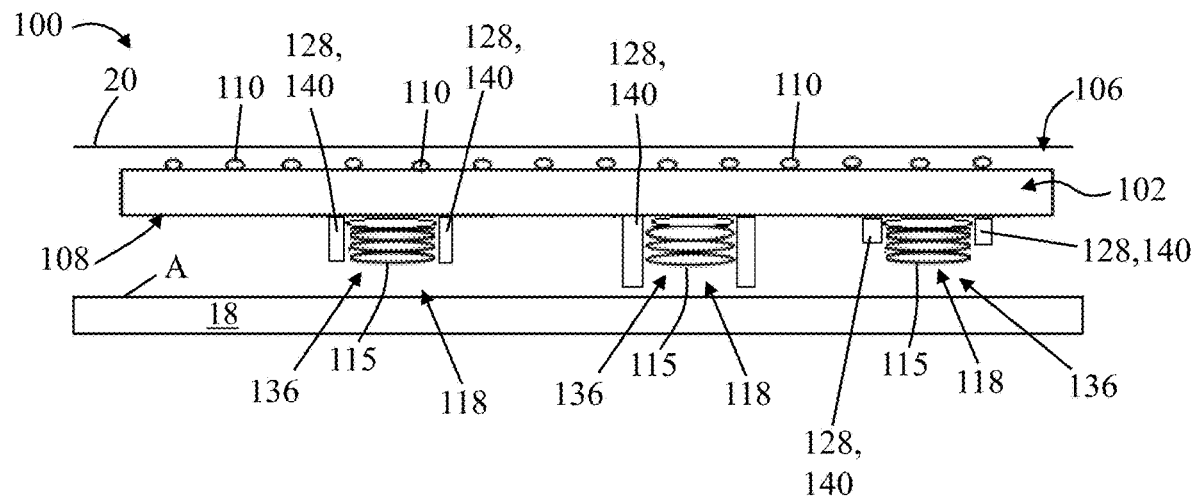
FIG. 12 is a side view of a comfort assembly and a cushion.

FIG. 12 illustrates a comfort assembly 100. The carrier 102 comprises a spacer layer 128 supported on, at, or by the second side or B-side 108 of the carrier 102. In FIG. 12, the spacer layer 128 is provided as strips or segments 140 of material that are supported at, on, or by the carrier 102. The strips or segments 140 are spaced apart from one another to define a recess 136 therebetween. At least part of the effector system 115 may be received into the recesses 136. The height of the strips or segments 140 (distance extending from the carrier 102) may be such that the top surfaces of the elements of the effector system, here the air cells 118, are generally even with, or are proud of, or extend below the top or planar surfaces of the segments 140 of the spacer layer 12.

Figure 13:
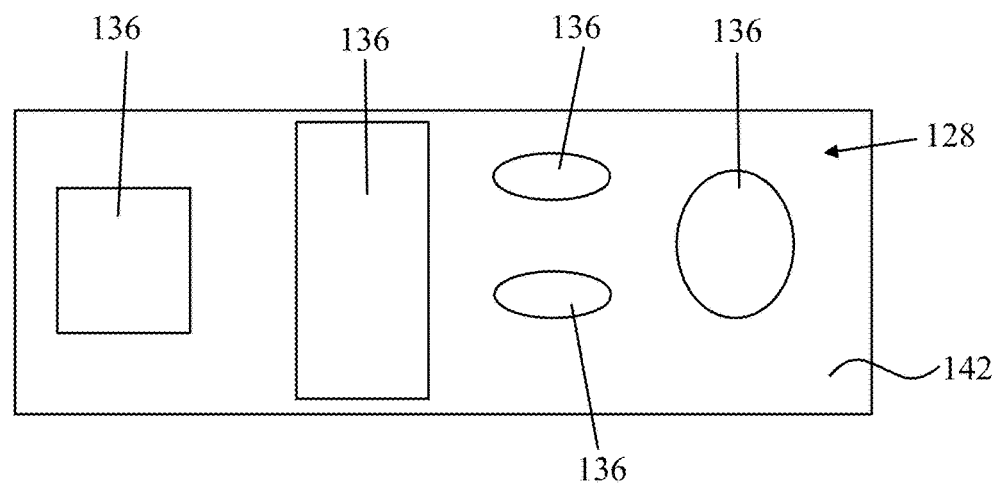
FIG. 13 is a top view of a spacer layer.

FIG. 13 illustrates a spacer layer 128. The spacer layer 128 comprises a substrate 142 and a plurality of recesses 136. The recesses are configured to receive one or more elements of the effector system. One or more of the recesses 136 may be a complete absence of material relative to the surrounding substrate 142; one or more of the recesses 136 may have a reduced height where the material thickness in the recesses 136 has been reduced relative to the adjacent substrate 142; or a combination thereof. The spacer layer 128 may be supported at, on, or by the carrier as disclosed herein.

Figure 14:
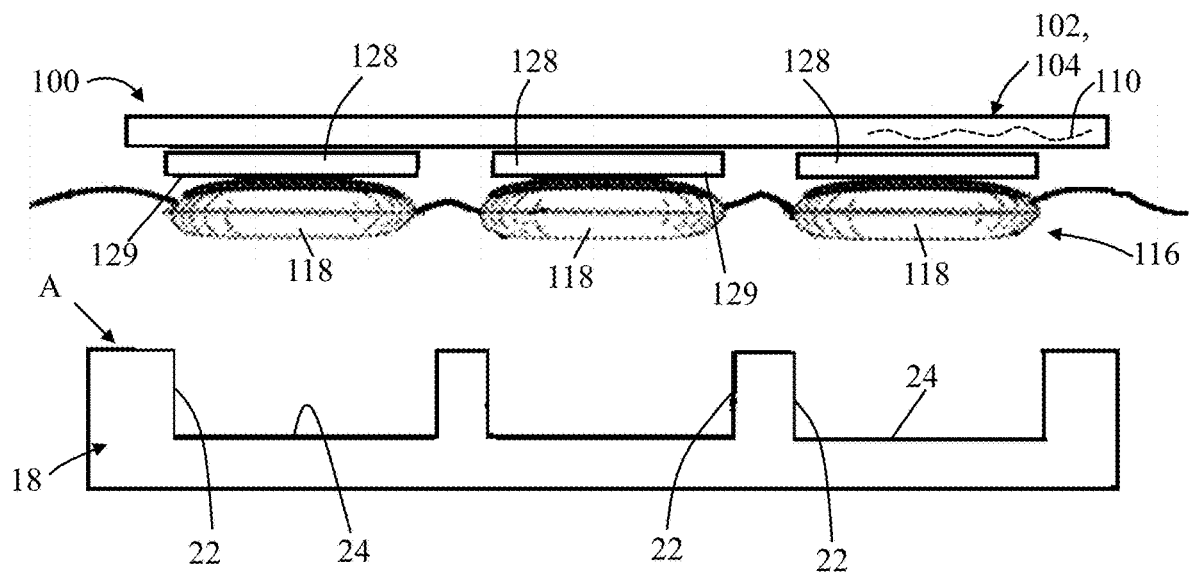
FIG. 14 is a side view of a comfort assembly and a cushion.

FIG. 14 illustrates the comfort assembly 100. The comfort assembly comprises a carrier 102, a thermal device 104, a pneumatic device 116, and one or more spacer layers 128 provided between or sandwiched between the carrier 102 and the pneumatic device 116. The carrier 102 may include one or more heating wires 110 of the thermal device 104. The carrier 102, the thermal device 104, the one or more spacer layers 128, and the pneumatic device 116 may be connected or attached together to form a unitary comfort assembly 100. To form the unitary assembly 100, the elements of the comfort assembly 100 may be connected or secured together via one or more fastening devices disclosed herein, for example tape, a double-sided tape, a pressure sensitive adhesive (PSA), or any combination thereof.

Figure 15:
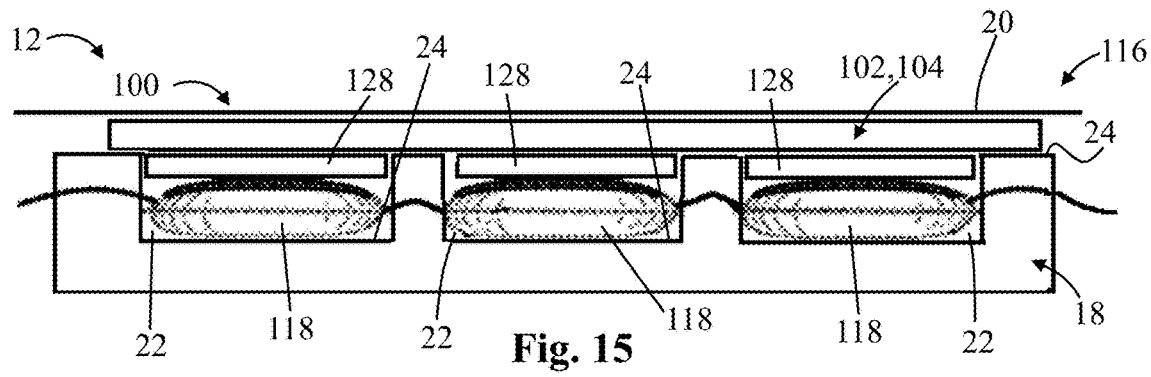
FIG. 15 is a side view of a comfort assembly attached to a cushion.
Figure 16:
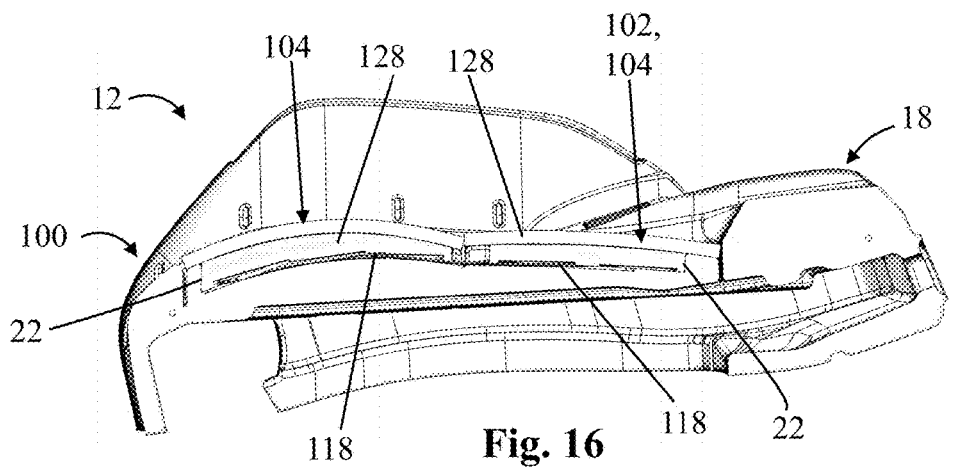
FIG. 16 is a side view of a comfort assembly attached to a cushion.

With additional reference to FIGS. 15 and 16, after the elements of the comfort assembly 100 are attached or connected, the comfort assembly 100 may be inserted into, attached to, or at least partially supported in one or more recesses or pockets 22 defined in the A-surface of the cushion or support surface 18.

The recesses or pockets 22 may be configured or sized to accommodate one or more of the air cells 118 and/or one or more of the spacer layers 128 and/or one or more of the heating devices 104. The one or more air cells 118 are situated in the one or more pockets or recesses 22 defined in the cushion 18 so that during use, the one or more air cells expand in a direct info the trim or cover layer 20 to provide a massage and/or lumbar function to a user seated in the vehicle seat. The one or more spacer layers 128 may be a plush pad disposed over the one or more air cells 118 and disposed within one or more of the recesses or pockets 22 of the cushion 18. The one or more spacer layers 128 may be configured to reduce or prevent read through of the one or more air cells 118 at the trim or cover layer 20 of the vehicle seat and/or to provide additional padding or support to the occupant of the vehicle seat.

The size and shape of the one or more recess 22 in the cushion may be substantially similar to a size and shape of the spacer layer 128. See also FIG. 17C for example, where a size and shape of the recess 22 is substantially the same size and shape as the spacer layer 128.

The spacer layer 128 has a top surface that is covered by the thermal device 104 or carrier. The spacer layer 128 has a bottom surface 129 that supports the effector device or to which the air cells 118 are connected. The effector device or air cells 118 extend from the bottom surface 129 of the spacer layer towards a bottom surface 24 of the recess or pocket 22 defined in the cushion.

In other configurations, such as illustrated in FIG. 15, the one or more recesses may be sized and configured to receive one or more air cells 118 and spacer layers 128, and the heating device 104 may extend across the top of two or more adjacent recesses or pockets 22. In such configurations, the top surfaces of the one or more air cells and/or spacer layer 128 may be proud, flush, or sub flush (below) adjacent top surface of the cushion or support surface 18. In other configurations, only the one or more air cells may be received or supported in a recesses or pocket and the one or more spacer layers and/or one or more heating devices 104 may extend across two or more adjacent recesses or pockets 22. A trim or spacer layer 20 may then be provided over the heating device 104.

The cushion 18 may include one or more recess 22. The cushion 18 may include a first recess, a second recess, etc. The first recess may be configured to receive one or more air cells 118 and one or more spacer layers 128. The second recess may be configured to receive one or more other air cells 118 of the effector device (that are different than the air cells received in the first recess) and one or more other spacer layers 128 (that is different than the spacer layer received in the first recess).

The carrier 102 or thermal device 104 may be configured to simultaneously cover a plurality of recesses defined in the A-surface of the cushion.

FIGS. 17A-17D illustrate steps for installing a comfort assembly 100 in a cushion or support device 18. The cushion or support device 18 may include one or more recesses 22 defined in the A-surface thereof. As was discussed with reference to FIGS. 14, 15, 16 above, the comfort assembly 100 may be preassembled. The preassembled comfort assembly 100 may be located or positioned within the recesses 22 before the trim or cover layer 20 is disposed or stretched over the comfort assembly 100 and the cushion 18.

Figure 17A:
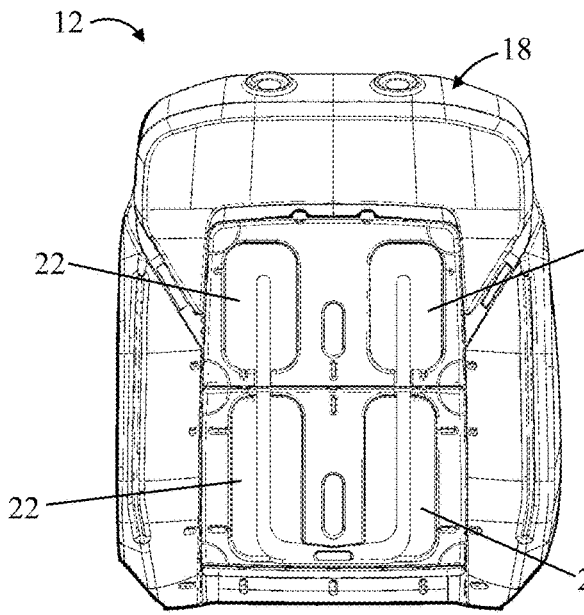
FIGS. 17A-17D illustrate steps for installing a comfort assembly in a cushion.
Figure 17B:
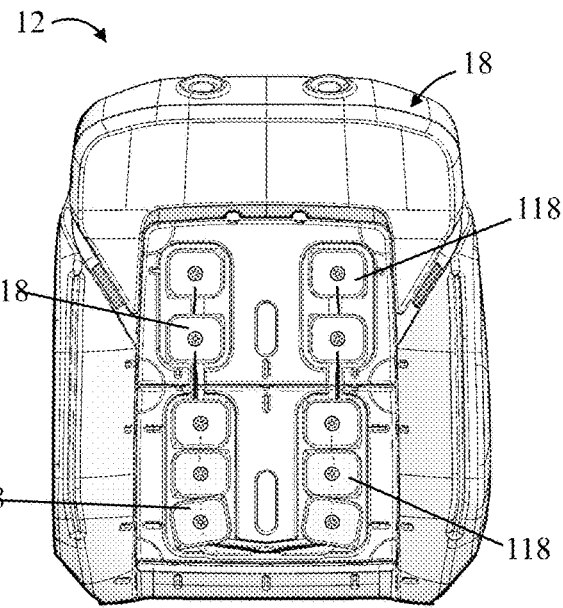
Figure 17C:
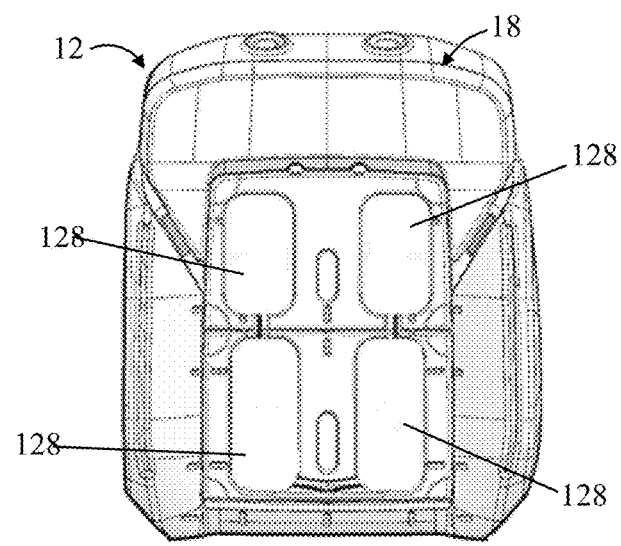
Figure 17D:
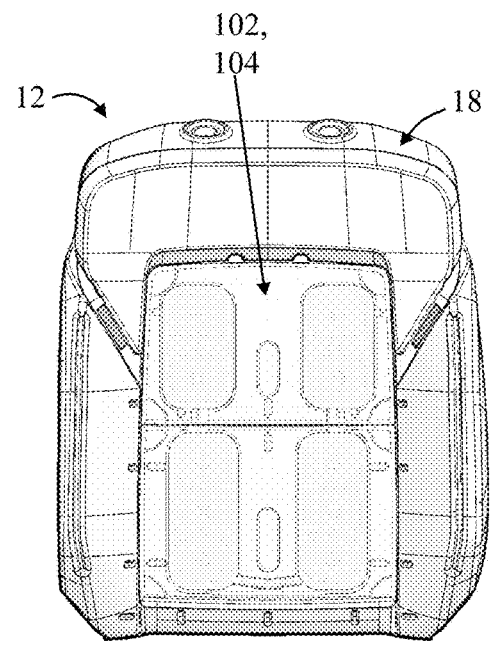

In another configuration, elements of the comfort assembly 100 may be individually installed on the cushion 18. For example, in FIG. 17B the pneumatic device 116 or air cells 118 may be placed within the recesses 22. Then the spacer layer 128 may be placed over the pneumatic device 116 or air cells 128 (FIG. 17C). Then, in FIG. 17D, the carrier 102 or thermal device 104 may be located or disposed over the spacer layers 128, the pneumatic device 116 and air cells 118, and the recesses 22 and simultaneously cover the recesses 22.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps. For example, disclosure of "a motor" does not limit the teachings to a single motor. Instead, for example, disclosure of "a motor" may include "one or more motors."

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below", or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The invention illustratively disclosed herein suitably may be practiced in the absence of any element which is not specifically disclosed herein.

Any of the elements, components, regions, layers and/or sections disclosed herein are not necessarily limited to a single embodiment. Instead, any of the elements, components, regions, layers and/or sections disclosed herein may be substituted, combined, and/or modified with any of the elements, components, regions, layers and/or sections disclosed herein to form one or more embodiments that may be or may not be specifically illustrated or described herein.

The disclosures of all articles and references, including patent applications and publications, testing specifications, are incorporated by reference for all purposes. Other combinations are also possible as will be gleaned from the following claims, which are also hereby incorporated by reference into this written description.

The invention claimed is:

1. A comfort assembly for a vehicle seat comprising a cushion, the comfort system comprising:
    a carrier comprising a thermal device, the carrier comprising a top side and an opposing bottom side, wherein the vehicle seat comprises a trim or cover layer that is disposed over the top side of the carrier;
    a spacer layer arranged against the bottom side of the carrier, the spacer layer comprises a foam pad;
    a first attachment device between the spacer layer and the bottom side of the carrier to attach the spacer layer to the bottom side of the carrier;
    an effector device arranged below the spacer layer so that the spacer layer is between the effector device and the bottom side of the carrier; and
    one or more attachment devices that attach the carrier to the effector device, the one or more attachment devices comprises welding;
    wherein the effector device is attached to the carrier with the one or more attachment device before the comfort assembly is installed onto a top side of the cushion of the vehicle seat.

2. The comfort assembly according to claim 1, wherein the effector device is a pneumatic device that comprises one or more air cells that are configured to expand and contract to provide a massage and/or lumbar function to an occupant supported in the vehicle seat, and the thermal device comprises one or more heating wires that are configured to generate heat; and wherein the spacer layer does not generate heat, and wherein the first attachment device comprises an adhesive.

3. The comfort assembly according to claim 2, wherein the effector device comprises one or more tubes and/or wires for connecting the effector device to a system for operating the pneumatic device.

4. The comfort assembly according to claim 2, wherein the one or more air cells are configured to expand in a direction of the trim or cover layer and compress the spacer layer against the bottom side of the carrier.

5. The comfort assembly according to claim 4, wherein the comfort assembly comprises a single connector for connecting the comfort assembly to a vehicle controller or power source, wherein the single connector is electrically connected to the thermal device and to the effector device.

6. The comfort assembly according to claim 4, wherein the cushion comprises a recess, and at least a portion of the one or more air cells are configured to be received in the recess, wherein the recess extends only partially through an entire thickness of the cushion.

7. The comfort assembly according to claim 6, wherein a size and shape of the recess defined in the cushion is substantially similar to a size and shape of the spacer layer.

8. The comfort assembly according to claim 6, wherein the cushion comprises a second recess, and at least another portion of the effector device is configured to be placed into the second recess.

9. A vehicle seat comprising the comfort assembly according to claim 6.

10. The comfort assembly according to claim 1, wherein the comfort assembly comprises a single connector for connecting the comfort assembly to a vehicle controller or power source, wherein the single connector is electrically connected to the thermal device and to the effector device.

11. The comfort assembly according to claim 1, wherein the spacer layer is a plush pad, and the effector device is pneumatic device that comprises one or more air cells that are configured to expand and contract to provide a massage and/or lumbar function to an occupant supported in the vehicle seat, wherein the cushion comprises a recess that extends only partially through a thickness of the cushion, and wherein a portion of the plush pad and least one air cell of the one or more air cells are configured to be disposed in the recess.

12. The comfort assembly according to claim 11, wherein a size and shape of the recess defined in the cushion is substantially similar to a size and shape of the plush pad.

13. A method of making the comfort assembly according to claim 1, wherein before the comfort assembly is installed onto the top side of the cushion, the method comprises:
    arranging the thermal device onto the carrier;
    arranging the spacer layer onto the bottom side of the carrier;
    attaching the spacer layer to the bottom side of the carrier with a first attachment device, wherein the first attachment device comprises an adhesive;
    arranging the effector device onto the spacer layer so that the spacer layer is between the effector device and the opposing bottom side of the carrier, the effector device comprising a plurality of air cells; and
    attaching the effector device to the carrier with the one or more attachment devices, wherein the one or more attachment devices comprise welding;
    wherein the top side of the cushion has a plurality of recesses, and the method comprises locating the comfort assembly onto the top side of the cushion so that at least some air cell of the plurality of air cells are at least partially situated in one of the plurality or recesses; and
    wherein the recess extends only partially through an entire thickness of the cushion.

14. A vehicle seat comprising the comfort assembly according to claim 1.

* * * * *